United States Patent [19]

Blackburn

[11] 4,334,652
[45] Jun. 15, 1982

[54] EXPANDIBLE DEVICES FOR INTERNALLY GRIPPING CORES OR THE LIKE

[76] Inventor: David Blackburn, 10, The Finches, Sittingbourne, Kent, ME10 4PY, England

[21] Appl. No.: 91,857

[22] Filed: Nov. 6, 1979

[30] Foreign Application Priority Data

Nov. 8, 1978 [GB] United Kingdom ............... 43644/78
Jan. 10, 1979 [GB] United Kingdom ................ 7900829

[51] Int. Cl.³ ............................................ B65H 75/24
[52] U.S. Cl. .................................. 242/72 R; 279/2 R
[58] Field of Search .................... 242/72 R, 46.4, 46.5; 279/2 R, 30, 1 C, 1 DC; 192/44, 45

[56] References Cited

U.S. PATENT DOCUMENTS 1,072,067  9/1913  Wild .................................. 242/72 R
2,039,149  4/1936  Dodge ........................... 242/72 R X
2,561,745  7/1951  Lerch ............................... 242/72 R
2,908,452 10/1959  Jacobsen ........................... 242/72 R
3,963,250  6/1976  Flagg .............................. 242/72 R X

FOREIGN PATENT DOCUMENTS 2809947  9/1979  Fed. Rep. of Germany .... 242/72 R

Primary Examiner—John M. Jillions
Attorney, Agent, or Firm—William A. Drucker

[57] ABSTRACT

An expandible device for internally gripping a core carrying a web of material has jaw segments forming an outer cylinder surrounding a body member which may be solid or hollow. Balls are arranged in recesses around the exterior of the body member and the jaw segments have inner grooves which receive the balls. The grooves are specially shaped to taper in depth and cooperate with the disposition of the balls so that part rotation of a core supported on the jaw segments will cause the grooves of these jaw segments to progressively run over the balls, thereby to cause the jaw segments to rise and expand outwardly from the body member into frictional gripping contact with the interior of the core.

16 Claims, 16 Drawing Figures

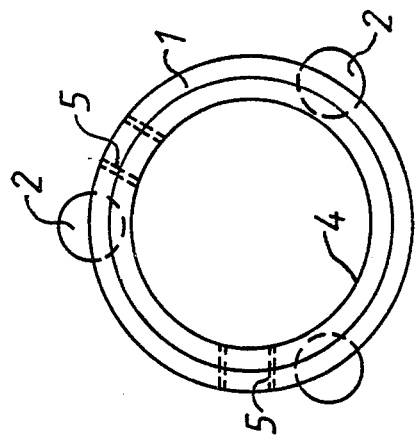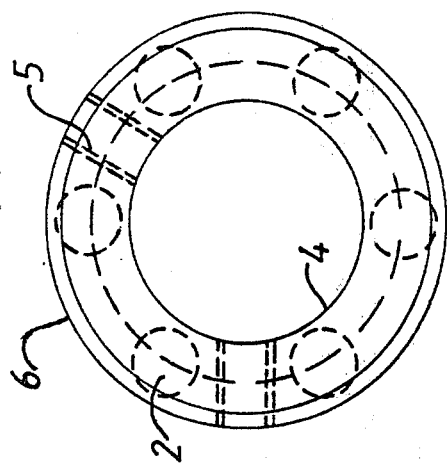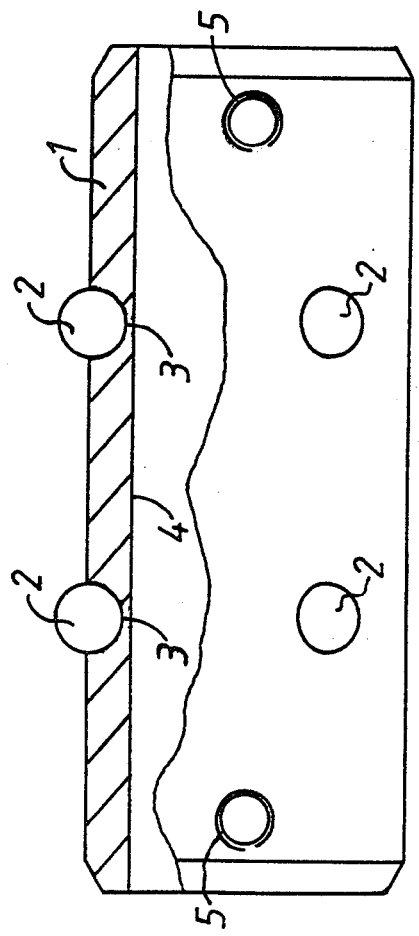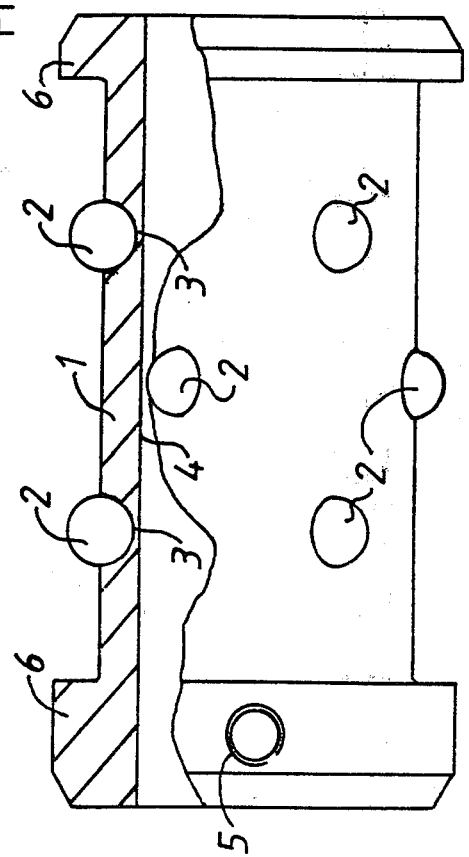

EXPANDIBLE DEVICES FOR INTERNALLY GRIPPING CORES OR THE LIKE

BACKGROUND OF THE INVENTION

The present invention relates to expandible devices for internally gripping cores or the like.

In conventional web treatments, where machines handle reels of paper, plastics, metal foils, textiles and other sheet material, the cores of these reels need to be mounted on the machines so that rotational drive can be selectively coupled to the cores to effect winding or unwinding of the web entrained on the cores. The cores carrying the webs are normally tubular components made from cardboard, metal or plastics material. To effect the rotational drive to a core, it is well known to employ an expandible device or core chuck onto which the core is mounted. The device then expands when it is desired to drive or lock the core to frictionally grip the interior of the core. Examples of known devices are described in U.K. patent specification Nos. 1,301,658, 1,362,649, 1,485,031 and 1,543,571. The known devices suffer from a number of disadvantages. Primarily:

(I) The range of expansion is often limited so that a particular device may need to be adopted for specific sizes of cores;

(II) There is often a relatively small zone of frictional contact between the interior of the core and the device when the latter is expanded to grip the core;

(III) In order to produce a compact device hitherto, the strength of certain components has to be sacrificed; and (IV) Positive location of individual parts of the devices is often difficult to achieve.

A general object of the present invention is to provide an improved form of expandible device for internally gripping cores or the like.

SUMMARY OF THE INVENTION

In its broadest aspect, the present invention provides an expandible device for internally gripping cores or the like; said device comprising a body member and a cylindrical structure surrounding the body member. The cylindrical structure is composed of a plurality of jaw segments and means, preferably resilient, retains the jaw segments on the body member. Balls locate in grooves of tapered depth between the body member and the jaw segments. Relative rotation or partial rotation between the cylindrical structure and the body member causes the balls to become located in shallower regions of the grooves to move the jaw segments outwardly from the body member.

In preferred embodiments of the invention, the balls are located in recesses in the exterior of the body member, while the associated grooves are provided in the inner surfaces of the jaw segments which form gripping elements relative to the core interior. The body member can be hollow and mounted directly or otherwise onto a cross-shaft of a machine. It is also possible to utilize a solid body member, especially in the so-called "shaftless" arrangement where a pair of opposed devices locate a core therebetween. In another construction, the cross-shaft is itself adapted to form the aforesaid body member.

The balls can be arranged in several axially spaced groups, each symmetrical about the axis of the body member. The balls of one group can be aligned in co-linear relationship longitudinally of the body member with respect to correspondings balls of another group. Each jaw segment may have one or more grooves. Each jaw segment may be operably associated with one or several balls. Various configurations or relative dispositions of balls and grooves are described hereinafter. It is preferable to so arrange the balls and grooves that relative rotational motion between the outer cylindrical structure defined by the jaw segments in either a clockwise or anti-clockwise direction will cause the balls to become located in successively shallower regions of the grooves to bring about the effective expansion of the cylindrical structure. The provision of balls engaging in grooves, in accordance with the invention, can produce a gradual progressive controlled expansion as a core mounted on or about the cylindrical structure is partly rotated to move the jaw segments over the balls to bring the balls into the shallower regions of the grooves. The jaw segments can then move in synchronism to simultaneously grip the interior of the core over a maximum area of contact. The jaw segments can, however, be easily and rapidly released by part rotation of the core in the opposite direction to before to cause the grooves to locate the balls with their deepest regions.

The provision of the balls engaging in grooves also serves to axially locate the jaw segments and the aforesaid retention means need only retain the jaw segments radially. Preferably, the retention means is resilient to bias the jaw segments into a contracted position with the balls in the deepest regions of the grooves. It is advantageous to provide means for initially urging the jaw segments apart to bring the balls into the shallower regions of the grooves upon relative rotation between the body member and the cylindrical structure. One form of urging means is simple spring clips located between the adjacent ends of the jaw segments. These spring clips can then also project beyond the jaw segments to contact the core interior. When gripping is desired, the core is partly rotated to tilt the spring clips and this effects part rotation of the outer cylindrical structure causing the jaw segments to rise at one end or the other, or in certain embodiments uniformly as they roll over the balls in their initial mutual expansion.

The body member and/or the jaw segments may have flanges or shoulders for locating a core engaged on the device.

The invention may be understood more readily and various other features of the invention may become apparent, from consideration of the following description.

BRIEF DESCRIPTION OF DRAWINGS

Embodiments of the invention will now be described, by way of examples only, with reference to the accompanying drawings, wherein:

FIG. 4 is a part-sectional side view of a modified body member for use in the device shown in FIGS. 1 to 3, or in other embodiments of the invention.

FIG. 5 is a diagrammatic end view of the body member shown in FIG. 4;

FIG. 15 is a part-sectional side view of a modified body member for use in a further embodiment of the invention; and FIG. 16 is a diagrammatic end view of the body member shown in FIG. 15.

DESCRIPTION OF PREFERRED EMBODIMENT

Figure 1:
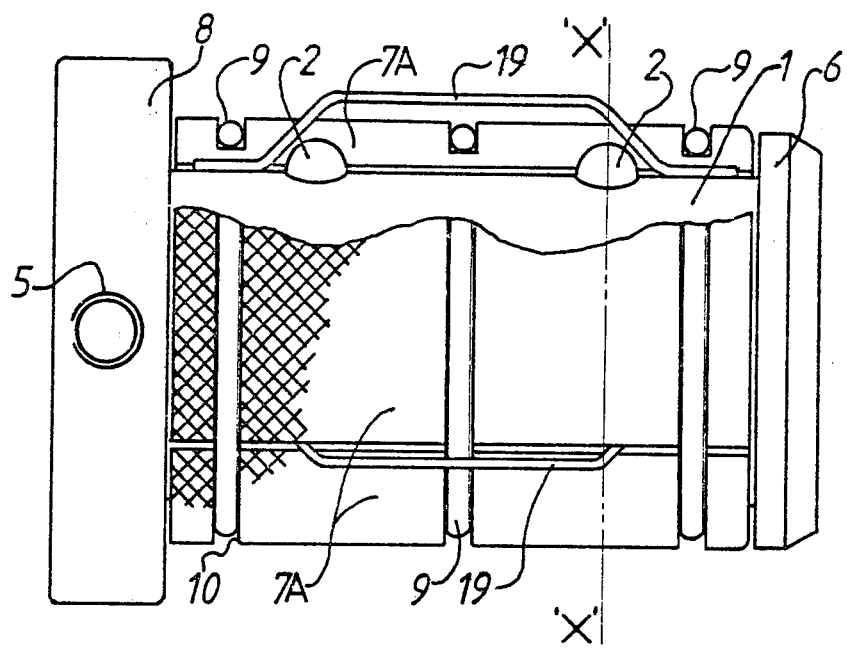
FIG. 1 is a side view of a device made in accordance with the invention, with part of the structure removed.
Figure 2:
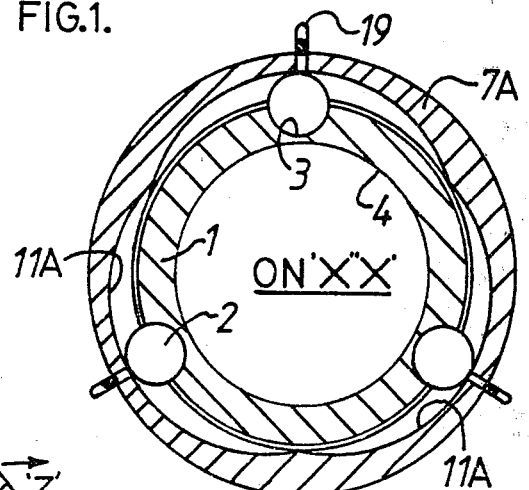
FIG. 2 is a cross-sectional view of the device shown in FIG. 1, the view being taken along the line X—X of FIG. 1.
Figure 3:
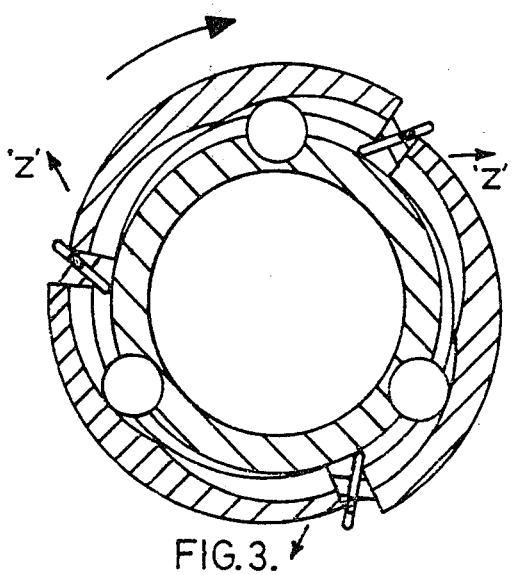
FIG. 3 is a view of the device corresponding to FIG. 2 but depicting the device in a different operating position.

As shown in FIGS. 1 to 3, a device constructed in accordance with the invention has a central body member 1 of hollow cylindrical form having a regular through bore 4. The body member 1 has flanges 6,8 at its ends. During use, the member 1 locates onto a rotatable cross-shaft (not shown) and the shaft extends through the bore 4. Detachable fixing means, such as one or more screws or bolts located in screw-threaded bores 5 in at least the flange 8, serve to fix the member 1 to the shaft for rotation therewith.

The body member 1 is provided with recesses 3 in its outer periphery which receive balls 2. In the illustrated embodiment, six balls 2 are arranged in two axially-spaced groups, each composed of three balls. The balls 2 of each group are located in symmetrical manner relative to the rotational axis, i.e., the axis of the body member 1. Each ball 2 of one group is aligned longitudinally of the body member 1 with a corresponding ball 2 of the other group. The recesses 3 which locate the balls 2 are of hemispherical shape, at least over the inner regions contacting and guiding the balls 2. Although the recesses 3 may be machined directly in the body member 1, it is possible to provide bearing inserts set into bores in the body member 1 and to shape the inserts internally to define the recesses 3. The recesses 3 have an overall depth relative to the outer peripheral surface of the body member 1 such that the balls 2 project outwardly beyond this peripheral surface. The outer peripheral surfaces of the balls 2 thus lie on a common circle described from the axis of the body member 1. The balls 2 are able to rotate freely within their recesses 3.

Figure 6:
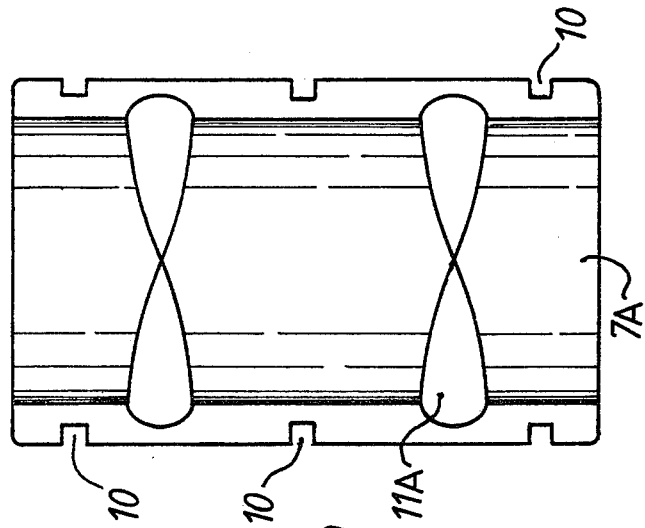

The body member 1 with its balls 2 is surrounded by an outer cylindrical structure composed of a number (in the illustrated embodiment three) of separate gripping elements or jaw segments 7A. The jaw segments 7A are spaced from the outer periphery of the body member 1 to overlay and contact the balls 2. The jaw segments 7A have shaped arcuate grooves 11A, which taper in depth on their inner surfaces. These grooves 11A locate with the balls 2. Each segment 7A has two pairs of such grooves 11A axially spaced to mate with a pair of respective balls 2 of both groups of balls 2. Each pair of circumferentially-aligned grooves 11A may take the shape depicted in FIGS. 2, 3 and 6 to adjoin one another with their deepest regions. The jaw segments 7A are displaceable in relation to the body member 1 to permit the device overall to expand and contract. FIG. 2 shows the jaw segments 7A in their contracted position while FIG. 3 shows the jaw segments 7A in their expanded position. The jaw segments 7A are retained in position around the body member 1 and in their contracted position by resilient means which permit the expansive displacement of the jaw segments 7A. As illustrated, this resilient means takes the form of three endless bands 9 located in aligned grooves 10 in the outer surface of the jaw segments 7A.

Longitudinal slots or gaps are provided between the adjacent ends of the jaw segments 7A and shaped resilient spring clips 19 lock into the gaps. As shown in FIG. 1, the clips 19 each have end portions extending axially of the device and contacting the body member 1 and a central portion bent radially outwardly from these end regions and extending parallel to the axis of the body member 1. These central regions of the clips 19 project beyond the outer surface of the contracted jaw segments 7A, as shown in FIG. 2. Although the clips 19 can be positively located with retention means, in the illustrated embodiment no special measures are taken and the ends of the jaw segments 7A are urged into mutual contact with the clips 19 by the action of the bands 9.

In the contracted position of the device as shown in FIG. 2, the bands 9 maintain the jaw segments 7A in locations with the each ball 2 engaged in the deepest region of the adjacent associated groove 11A of the associated jaw segment 7A. In this contracted position, the clips 19 extend radially of the axis of the body member 1. During use, a core (not shown) is located on the device. With the jaw segments 7A in the contracted position of FIG. 2, the jaw segments 7A are spaced from the interior of the core but the central regions of the spring clips 19 contact the interior surface of the core to ensure concentricity and provide the necessary actuation contact between the core and the device. Since the spring clips 19 can be deflected to a certain extent, various sizes of cores can be mounted on the same device. Preferably, the exterior surfaces of the jaw segments 7A are serrated or otherwise treated to provide frictional contact with the interior surface of the core when the segments 7A are expanded to adopt the position of FIG. 3. When it is desired to make rotatable driving connection between the cross-shaft and the core, the segments 7A are expanded to firmly contact the interior of the core. This expansion of the segments 7A is achieved by partly rotating the core clockwise (as represented by the arrow in FIG. 3) or anti-clockwise to cause the clips 19 to tilt to adopt a non-radial disposition. This, in turn, initially urges one of the adjacent pairs of ends of the jaw segments 7A apart against the restoring force of the bands 9 and then imparts part rotation to the jaw segments 7A relative to the body member 1. The jaw segments 7A thus move around the body member 1 and the grooves 11A roll on the balls 2 to bring the balls 2 progressively into the shallower regions of the grooves 11A. This, in turn, initially causes the leading ends of the jaw segments 7A to become raised into firm wedging contact with the interior of the core when the grooves 11A take the form shown in FIG. 6. Continued rotation of the core under load causes a turning moment to be exerted on the jaw segments 7A about the balls 2 which tends to raise the trailing ends of the jaw segments 7A as indicated by arrows Z in FIG. 3, thus increasing the grip between the core and the jaw segments 7A. With the jaw segments 7A expanded as described, torque can be transmitted between the cross-shaft and the core. To release the core from the expanded jaw segments 7A, the core need only be partly rotated usually manually, in the opposite direction to that adopted on take-up to permit the spring clips 19 to resile to their normal radial position and also force the jaw segments 7A in unison back over the balls 2 so that the grooves 11 then again contact the balls 2 with their deepest regions to re-adopt the contracted position of FIG. 2.

Although the spring clips 19 are advantageous they are not wholly essential, since the jaw segments 7A can make contact with the interior of the core in their contracted position sufficient to initially displace the jaw segments 7A when the core partly rotates to cause the necessary expansion.

The end flanges 6,8 of the body member 1 can prevent the ingress of foreign matter between the jaw segments 7A and the body member 1 and the larger flange 8 can provide an axial location for the core. Since the balls 2 located in the grooves 11 axially locate the jaw segments 7A on the body member 1, it is possible to provide shoulder or flanges on the ends of the jaw segments 7A themselves to axially locate the core. Conversely, in a modified device, neither the jaw segments 7A nor the body member 1 has location flanges and FIGS. 4 and 5 depict the body member 1 of this device, which is used with the jaw segments 7A and other components depicted in FIGS. 1 to 3.

Figure 9:
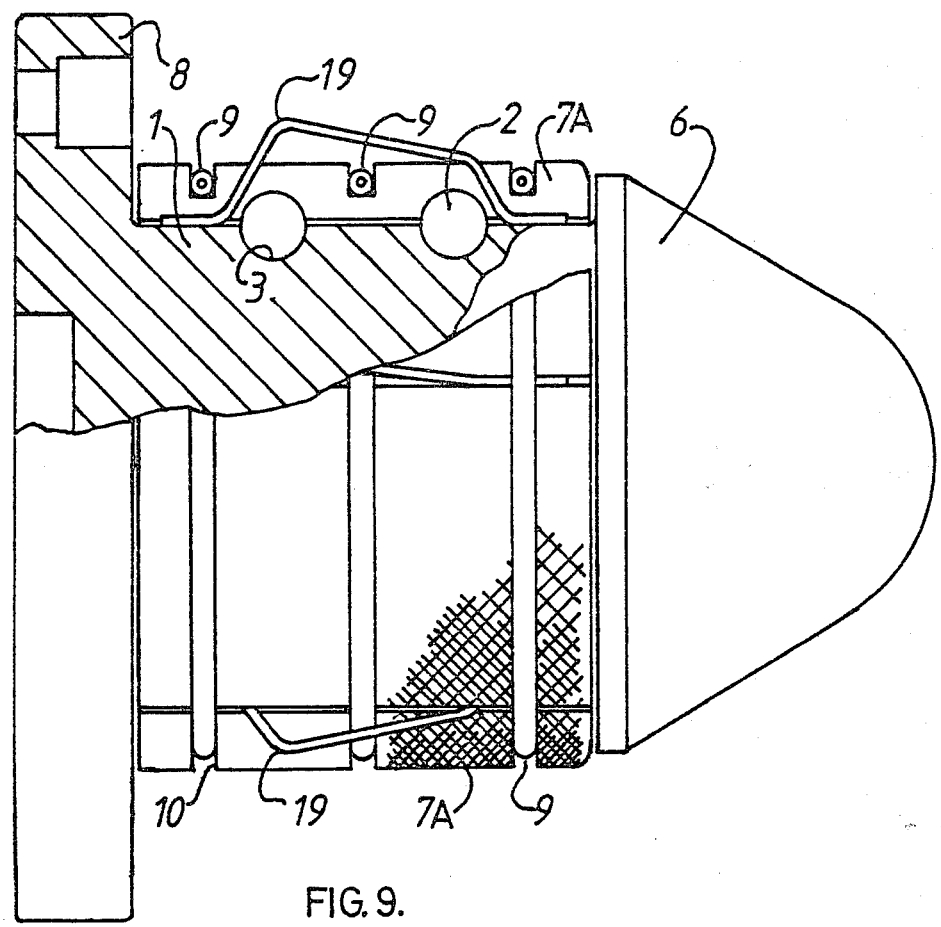
FIG. 9 is a view corresponding to FIG. 1 depicting another device constructed in accordance with the invention.
Figure 10:
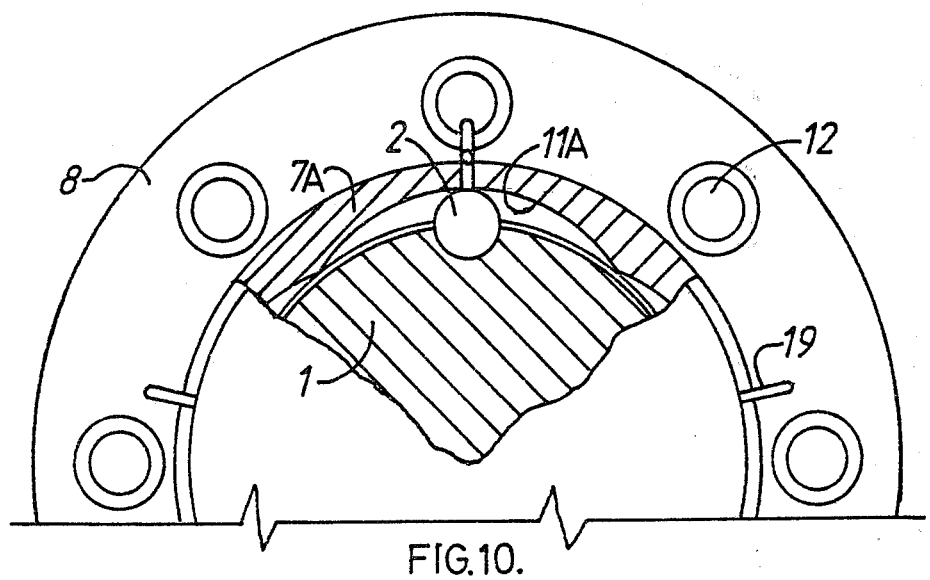
FIG. 10 is a part-sectional end view of the device shown in FIG. 9.

FIGS. 9 and 10 depict another embodiment of a device constructed in accordance with the invention. In FIGS. 9 and 10 like reference numerals denote like or analogous parts to FIGS. 1 to 3. The body member 1 of the device shown in FIGS. 9 and 10 is solid without a through bore and the device is intended to be used in the so-called "shaftless" arrangement. In this application, the core is mounted or supported between a pair of devices, as illustrated in FIGS. 9 and 10. The body member 1 has a tapered end region 6 which is inserted through one end of the core. This region 6 acts as a lead or guide to centralize the core between the body members 1 of the two devices. The body member 1 also has a flange 8 which serves to permit the device to be secured to a rotatable member of a machine frame with the aid of screws or bolts engaged through bores 12 in the flange 8. The flange 8 may also axially locate the core between the devices. It is, however, possible to drive the body member 1, for example, by engaging a stub shaft within a recess in the end of the body member 1 remote from the end region 6 and by providing key means, such as splines, between the stub shaft and the body member 1. The body member 1 has some ten balls 2 arranged in two-axially spaced groups, each composed of five symmetrically located balls 2. The outer cylindrical structure surrounding the body member 1 and the balls 2 is composed of five jaw segments 7A and having two pairs of inner grooves 11A shaped, for example, as in FIG. 6. Spring clips 19 again locate between adjacent ends of the jaw segments 7A. These clips 19 are, however, of modified shape compared with those of FIGS. 1 to 3 having a central outer region non-parallel to the axis of the body member 1 with an outermost curved zone nearest the flange 8. The device operates as described previously in connection with FIGS. 1 to 3.

Figure 7:
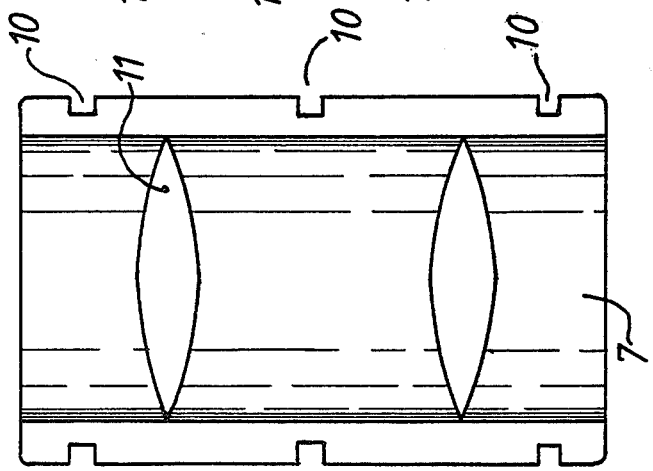
Figure 12:
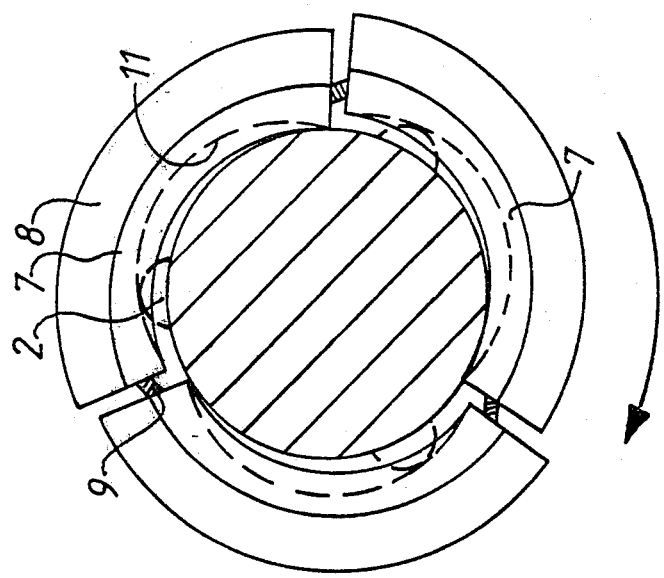
FIG. 12 is a part-sectional end view of the device shown in FIG. 11.
Figure 11:
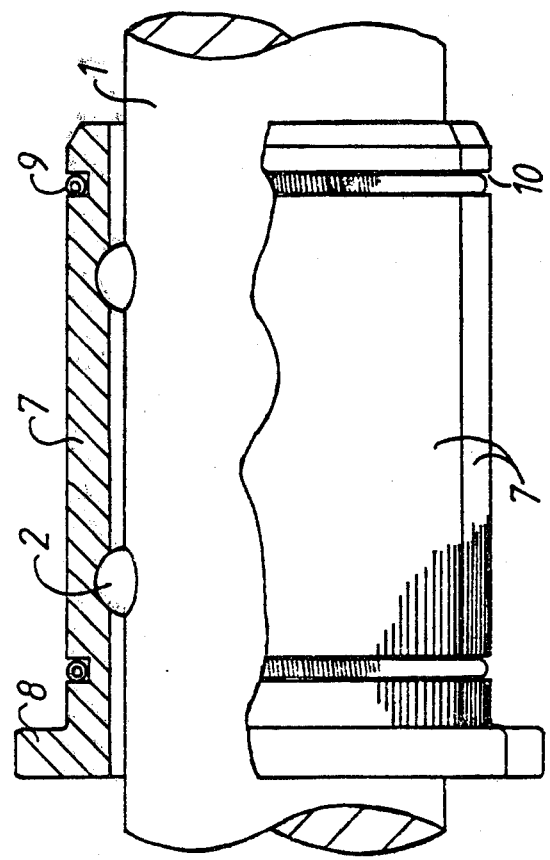
FIG. 11 is a view corresponding to FIG. 1 depicting a further device constructed in accordance with the invention.

FIGS. 11 and 12 depict a further embodiment in which like reference numerals again denote like or analogous parts to FIGS. 1 to 3. In contrast to the previous embodiments, the body member 1 of the device shown in FIGS. 11 and 12 is the cross-shaft of the machine itself. The body member 1 or cross-shaft is again provided with balls 2 located in recesses 3 as in FIGS. 1 to 3. In this embodiment, only two bands 9 are provided to retain the jaw segments (designated 7) on the body member 1 and the spring clips 19 are omitted entirely, as mentioned previously. The grooves (designated 11) receiving the balls 2 here take the shape depicted in FIG. 7, but this is exemplary and the shape depicted in FIG. 6 could be adopted if desired. The jaw segments 7 in this example also have shoulders 8 at one end which serve to axially locate the core. As shown in FIG. 12, when the core is rotated clockwise, the jaw segments 7 move over the balls 2 as the grooves 11 are shaped as in FIG. 7 the trailing ends of the jaw segments 7 are initially raised instead of the leading ends in the case of the embodiment depicted in FIGS. 1 to 3. Otherwise, the operation of the device is as described previously.

Figure 14:
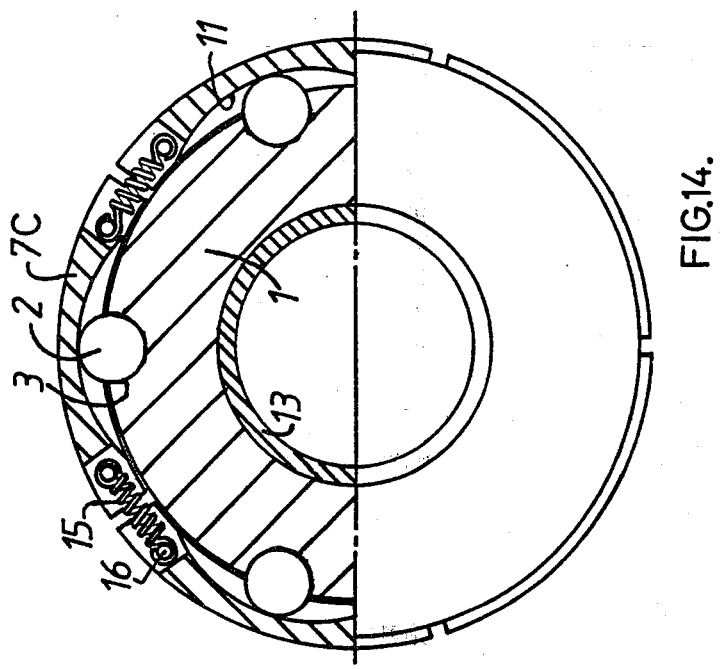
FIG. 14 is a part-sectional end view of the single device shown in FIG. 13.
Figure 13:
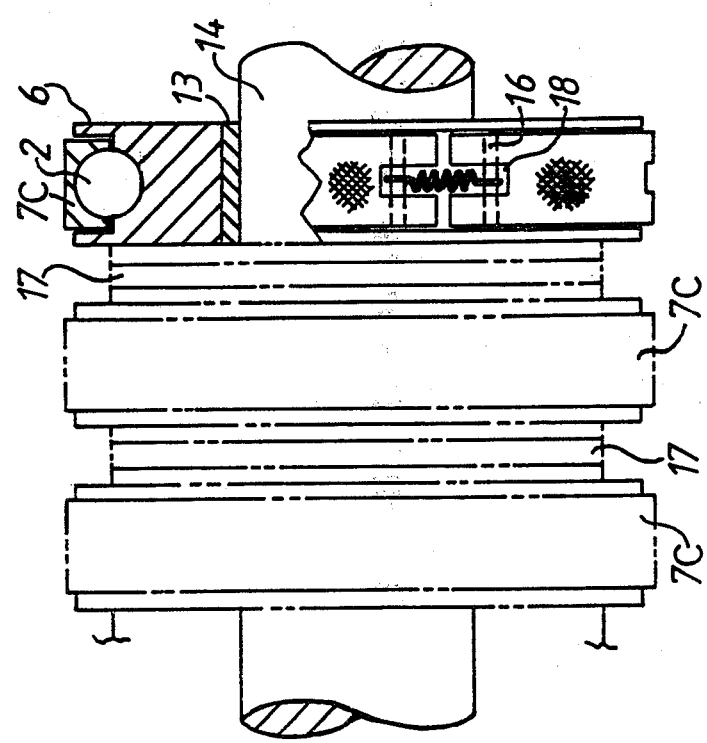
FIG. 13 is a part-sectional side view of a further device and composite arrangement constructed in accordance with the invention.

FIGS. 13 and 14 depict another embodiment of a device constructed in accordance with the invention. This device also has a hollow cylindrical body member 1 but here a bearing bush or sleeve 13 is fixed, e.g., as an interference or press fit inside the bore of the body member 1. The body member 1 is again provided with a plurality of balls 2 in recesses 3 in its outer periphery but here the balls 2, which number five, are arranged in one single group symmetrical about the axis of the body member 1. The body member 1 has end flanges 6 axially locating a cylindrical structure surrounding the body member 1 and composed of five jaw segments 7C. Each jaw segment 7C has a single tapered groove 11 on its inner surface which receives one of the balls 2. The groove 11 may take the form of one of the grooves 11,11A shown in FIGS. 6 or 7. The jaw segments 7C are retained and held in their retracted position by means of tension springs 15. The springs 15 are located in recesses 18 in the ends of the jaw segments 7C and fixed thereto with the aid of pins 16. The device is mounted with its sleeve 13 on a cross-shaft 14 so that the body member 1 is rotatable in relation to the shaft 14. The body member 1 is then locked for rotation with the cross-shaft 14 by some other means. Otherwise, the device operates as described previously. The device shown in FIGS. 13 and 14 is axially compact in relation to the cross-shaft 14 and several separate devices may be mounted on the shaft 14 in spaced relationship, as shown in chain-dotted lines in FIG. 13. The devices may locate within one common core or each device may locate within a respective one of a number of short cores carrying parallel webs. The additional means for rotatably coupling the body member 1 to the shaft 14 may do so selectively or otherwise. Where several devices are utilized, as illustrated in FIG. 13 and these receive separate cores, the coupling means can take the form of friction-plate assemblies 17 secured to the shaft 14 and located between the devices. These assemblies 17 can be clamped together with the devices to permit uniform torque to be transmitted to the cores. Hence, equal tensions to be imparted to the webs entrained around the cores, but a certain amount of slippage can occur.

Figure 8:
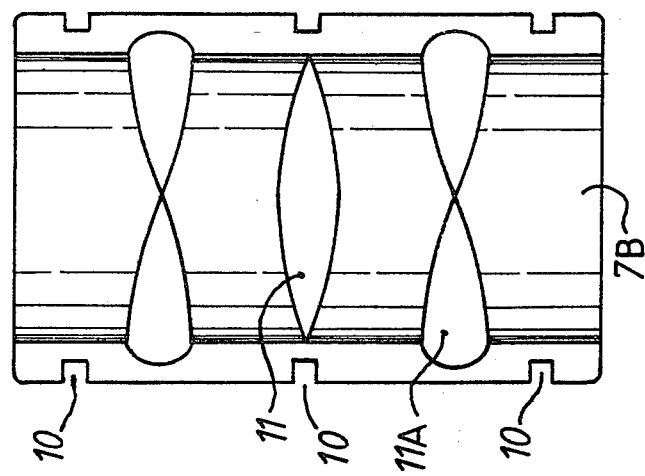
FIGS. 6 to 8 are underside views of alternative jaw segments for use in the device shown in FIGS. 1 to 3 or in other embodiments of the invention.

FIGS. 15 and 16 depict the body member of a further embodiment of the invention where again like reference numerals denote like analogous parts to FIGS. 1 to 3. The body member 1 of FIGS. 15 and 16 is, again, hollow for mounting on a cross-shaft (not shown). Flanges 6 are provided at the ends of the body member 1. The body member 1 has three axially-spaced groups of balls 2 located in recesses 3 in its outer periphery. Each of the groups of balls 2 is symmetrical but whereas the balls 2 of the endmost groups are longitudinally aligned, the balls 2 of the central groups are offset by, say, 60° relative to the associated aligned balls 2 of the endmost groups. The body member 1 is, again, surrounded by a cylindrical structure composed of three jaw segments with inner grooves located with the balls 2. The jaw segments take the form shown in FIG. 8 and designated 7B. The endmost grooves 11A of the jaw segments 7B locate with the endmost groups of balls 2 on the body member 1 while the central grooves 11 locate with the central group of balls 2. It is also possible for each jaw segment 7B to have central grooves of the type denoted 11A and outer grooves of the type denoted 11. The device operates as described previously but the provision of dissimilar grooves 11,11A and the offset groups of balls 2 provide the device with an enhanced range of expansion, since whatever direction the core is partly rotated in the jaw segments 7B are subjected to force as they move over the balls 2 which tends to raise both the leading and trailing ends of the jaw segments 7B simultaneously, thereby ensuring the core is reliably gripped more quickly.

I claim:

1. A-self-expandable device for internally gripping hollow cores or the like to impart torque thereto; said device comprising a body member, a cylindrical structure surrounding the body member for effecting frictional drive contact with a hollow core, the body member and the cylindrical structure being relatively rotatable about an axis of the device, the body member and the cylindrical structure having curvilinear confronting surfaces, the cylindrical structure being composed of a plurality of jaw segments, means for retaining the jaw segments on the body member, balls between the confronting surfaces and slender elongate, arcuate circumferential grooves formed in one of the confronting surfaces in registry with the balls, wherein each groove has a tapered depth which varies around the axis of rotation and is described with a radius of curvature similar in magnitude to that of the other confronting surface and the balls are positionally secured in relation to the other confronting surface to locate in said grooves; wherein rotation or relative partial rotation between the cylindrical structure and the body member causes shallower regions of the grooves to engage with the balls to move the jaw segments progressively outwardly from the body member to effect said frictional drive contact with the hollow core.

2. A device according to claim 1, wherein each groove has a semi-circular shape in a direction parallel to the axis of rotation and the engagement of the balls in the grooves locates the confronting surfaces in the axial direction.

3. A device according to claim 1, wherein each of the balls is located within one of said grooves and a shaped recess in the other of the confronting surfaces.

4. A device according to claim 3, wherein the recesses are hemispherical at least over the regions contacting the balls.

5. A device according to claim 1, wherein the jaw segments are separated by gaps and means is provided for urging the jaw segments apart to bring the balls into the shallower regions of the grooves upon relative rotation between the body member and the cylindrical structure.

6. A device according to claim 1, wherein the body member has at least one flange to provide axial location of a core engaged on the cylindrical structure.

7. A device according to claim 1, wherein the cylindrical structure has at least one flange to provide axial location of a core engaged on the cylindrical structure.

8. An expandable device according to claim 1, wherein the balls are located in recesses in the outer surface of the body member and the grooves of tapered depth are provided in the inner surfaces of the jaw segments.

9. A device according to claim 1, wherein said retaining means is resilient and holds the jaw segments in a contracted position with the balls located in the deepest regions of the grooves.

10. A device according to claim 1, and further comprising spring clips located between the ends of adjacent jaw segments, the spring clips projecting radially outwardly beyond the jaw segments so as to be able to contact the interior of a core and serving to impart corresponding part-relative rotation between the body member and the cylindrical structure upon part-rotation of the core.

11. A device according to claim 1, wherein the body member is hollow and can be mounted on a rotational cross shaft which can drive a core engaged on the cylindrical structure.

12. A device according to claim 1, wherein the balls are arranged in groups spaced-apart axially of the body member with the balls of each group being arranged symmetrically.

13. A device according to claim 12, wherein the balls of one group are each aligned longitudinally of the body member with a ball of another group.

14. A device according to claim 13, wherein the balls of a further group are each offset with the correspondingly aligned balls of the other groups.

15. A device according to claim 8, wherein the balls are arranged in groups each symmetrical about the body member and the total number of balls in each group corresponds with the number of jaw segments and wherein each jaw segment has one or more of said grooves and at least one ball engages in the or each groove of each jaw segment.

16. A device according to claim 1, wherein the balls and grooves are arranged to bring the balls into successively shallower regions of the grooves upon part-rotation of the cylindrical structure in either rotational direction relative to the body member.

* * * * *